United States Patent [19]

Bowie et al.

[11] Patent Number: 4,724,660
[45] Date of Patent: Feb. 16, 1988

[54] MOWER AND DRIVE TRAIN MOUNTING ASSEMBLY

[75] Inventors: Calvin Bowie, Orrville; Ricky Pendley; Dawson W. Hastings, both of Selma, all of Ala.

[73] Assignee: Allied Products Corporation, Chicago, Ill.

[21] Appl. No.: 858,359

[22] Filed: Apr. 30, 1986

[51] Int. Cl.⁴ .................. A01D 34/66; A01D 67/00
[52] U.S. Cl. ......................... 56/13.6; 56/320.1
[58] Field of Search ............ 56/13.6, 17.5, 320.1, 56/320.2, DIG. 22; 404/112

[56] References Cited

U.S. PATENT DOCUMENTS

| | | | |
|---|---|---|---|
| 2,759,305 | 8/1956 | Helbig | 404/112 X |
| 2,763,116 | 9/1956 | Flinchbaugh et al. | 56/13.6 |
| 2,816,410 | 12/1957 | Nobles | 56/13.6 |
| 2,838,901 | 6/1958 | Davis | 56/13.6 |
| 2,898,723 | 8/1959 | Goodall | 56/17.5 X |
| 3,007,378 | 11/1961 | Thieme et al. | 404/112 |
| 3,107,472 | 10/1963 | Witt et al. | 56/320.2 |
| 3,263,406 | 8/1966 | Hanson et al. | 56/13.6 |
| 3,757,500 | 9/1973 | Averitt | 56/13.6 X |
| 3,901,003 | 8/1975 | Erdman | 56/320.1 |
| 4,453,374 | 6/1984 | Kuhn | 56/320.1 |

Primary Examiner—Stephen J. Novosad
Assistant Examiner—John F. Letchford
Attorney, Agent, or Firm—Lockwood, Alex, FitzGibbon and Cummings

[57] ABSTRACT

A mower or similar device for cutting ground foliage or for surface conditioning is provided which has an improved deck construction that includes detachably engaged deck members that define housing areas which can substantially enclose pulley assemblies suitable for driving and being driven, the pulley assemblies being straddle-mounted by bearings or the like within said housing areas.

20 Claims, 14 Drawing Figures

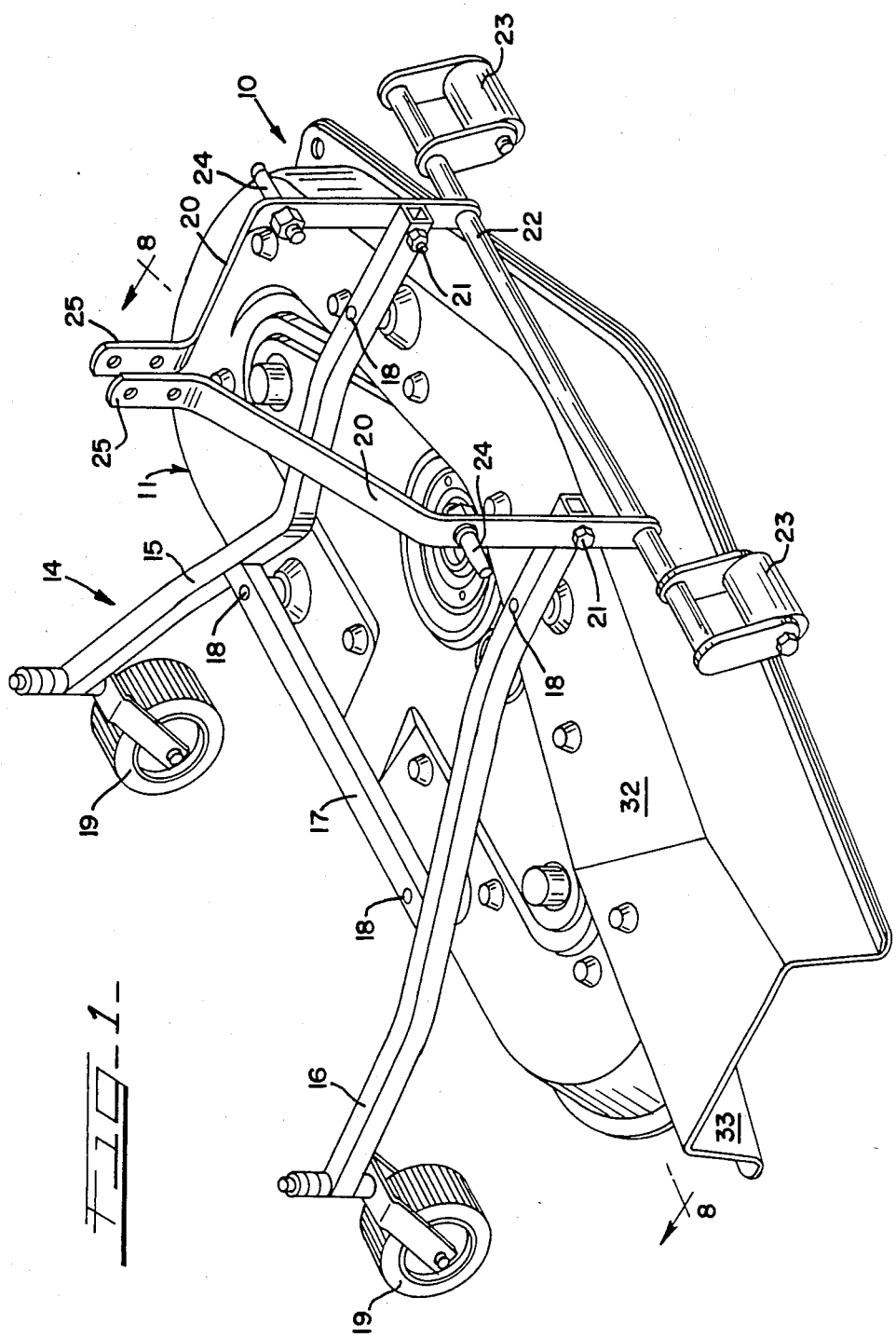

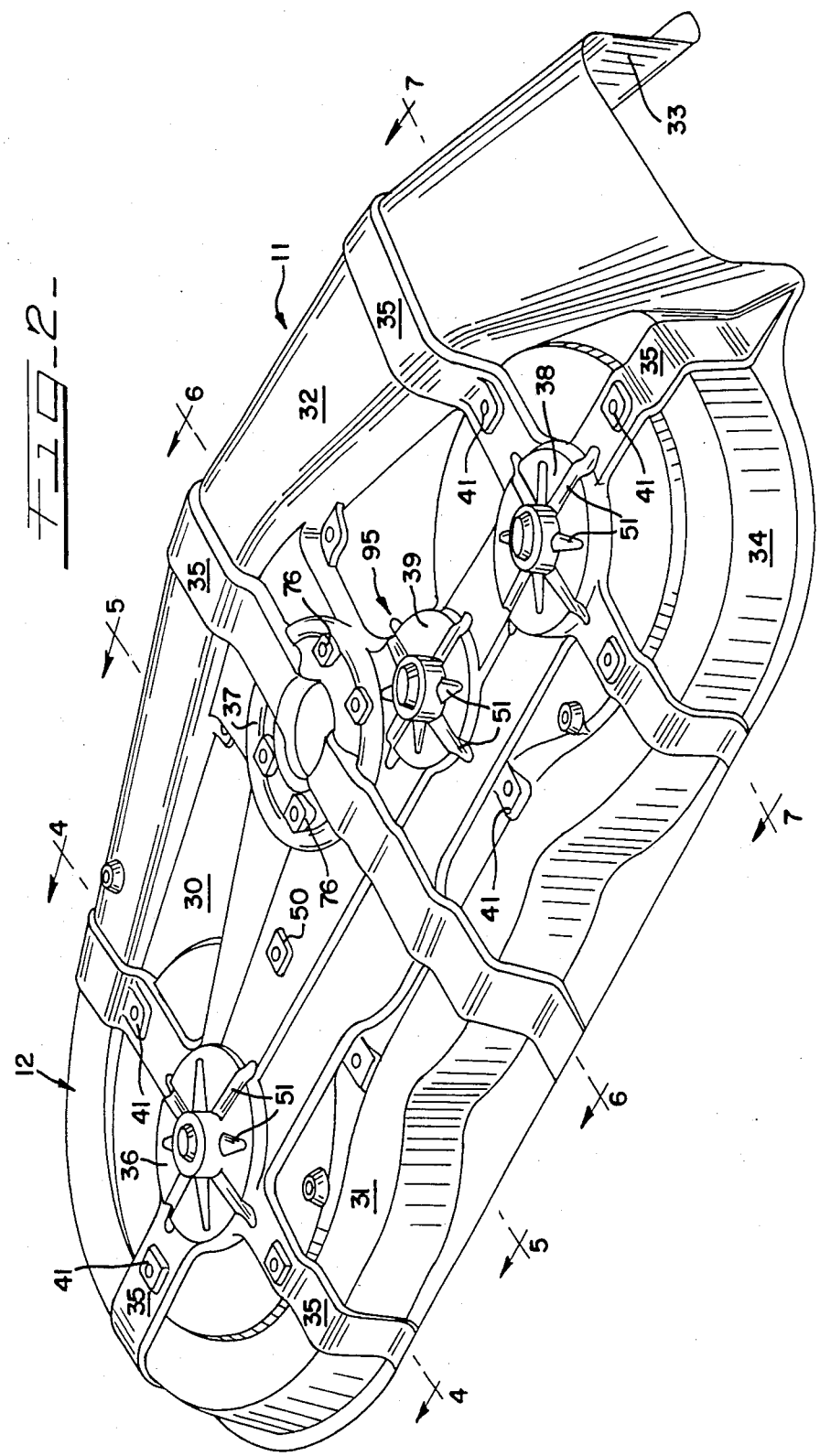

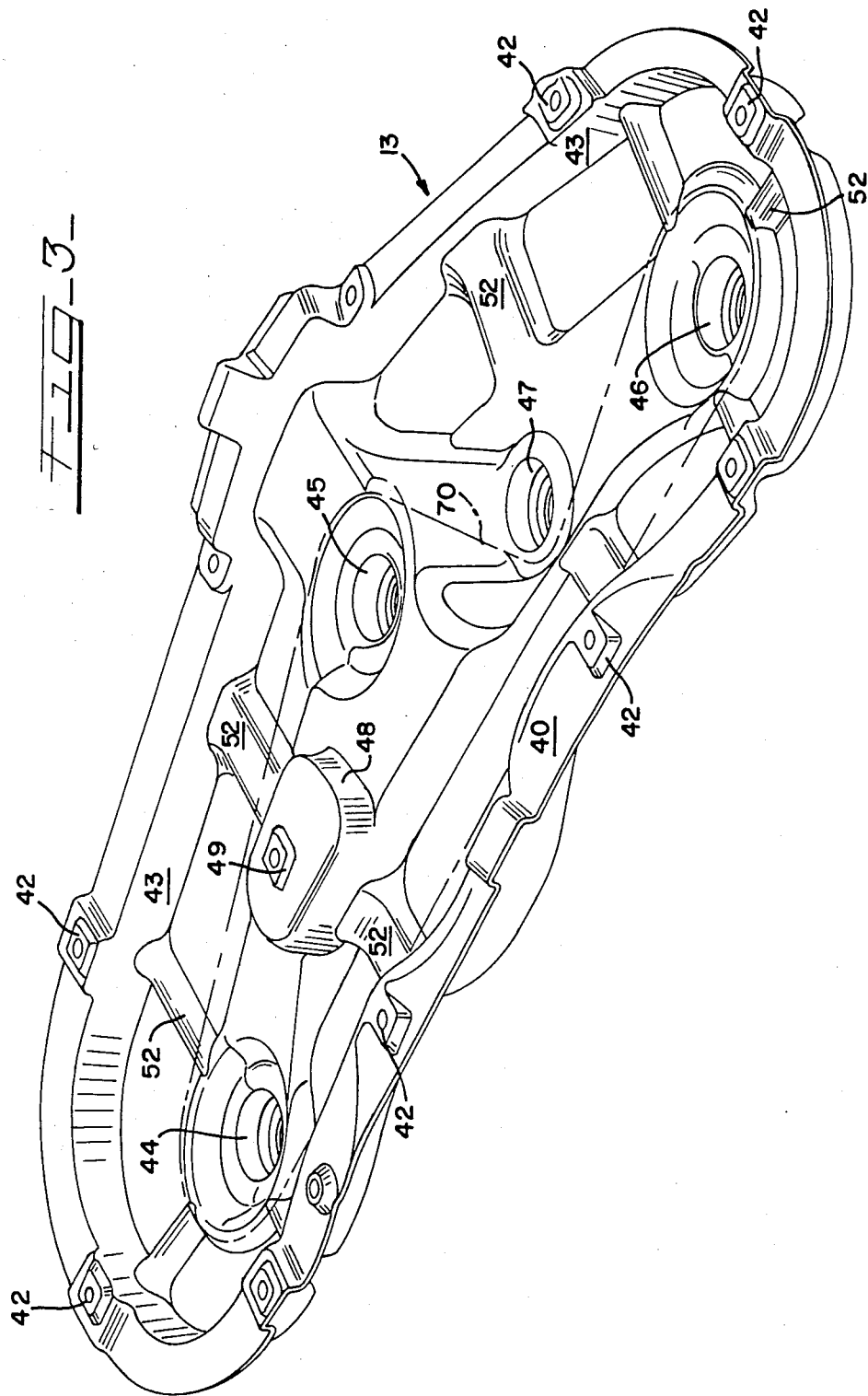

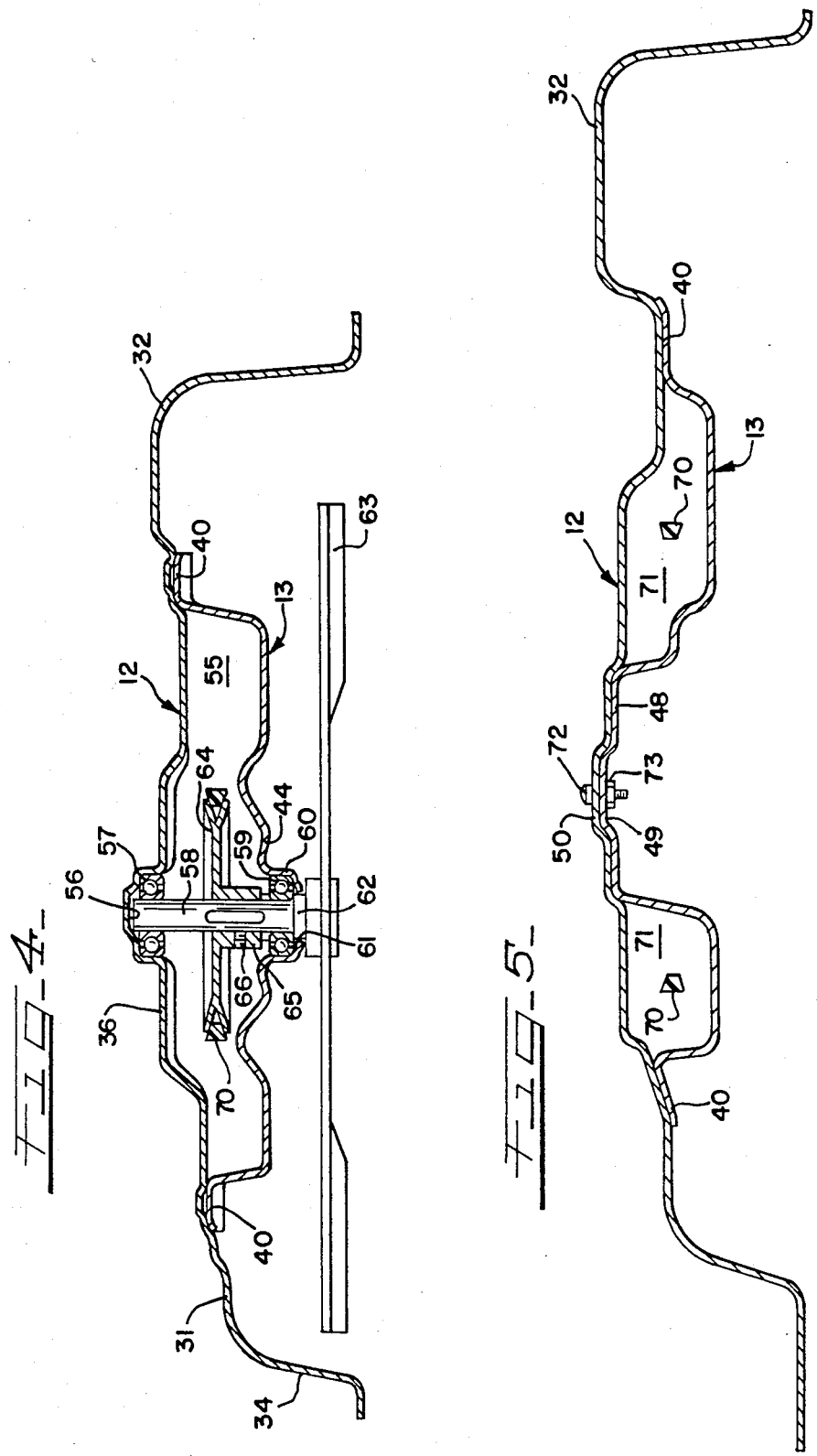

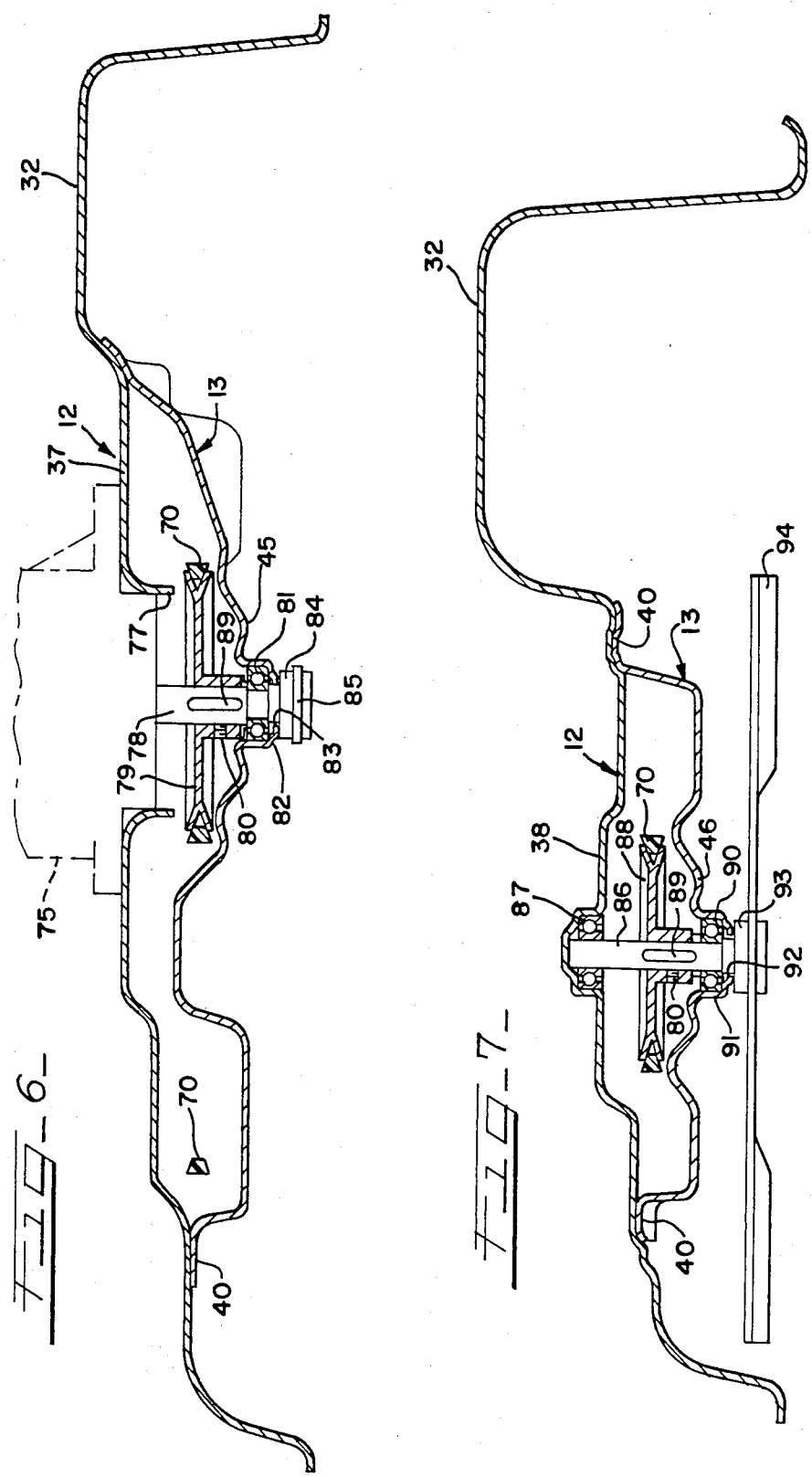

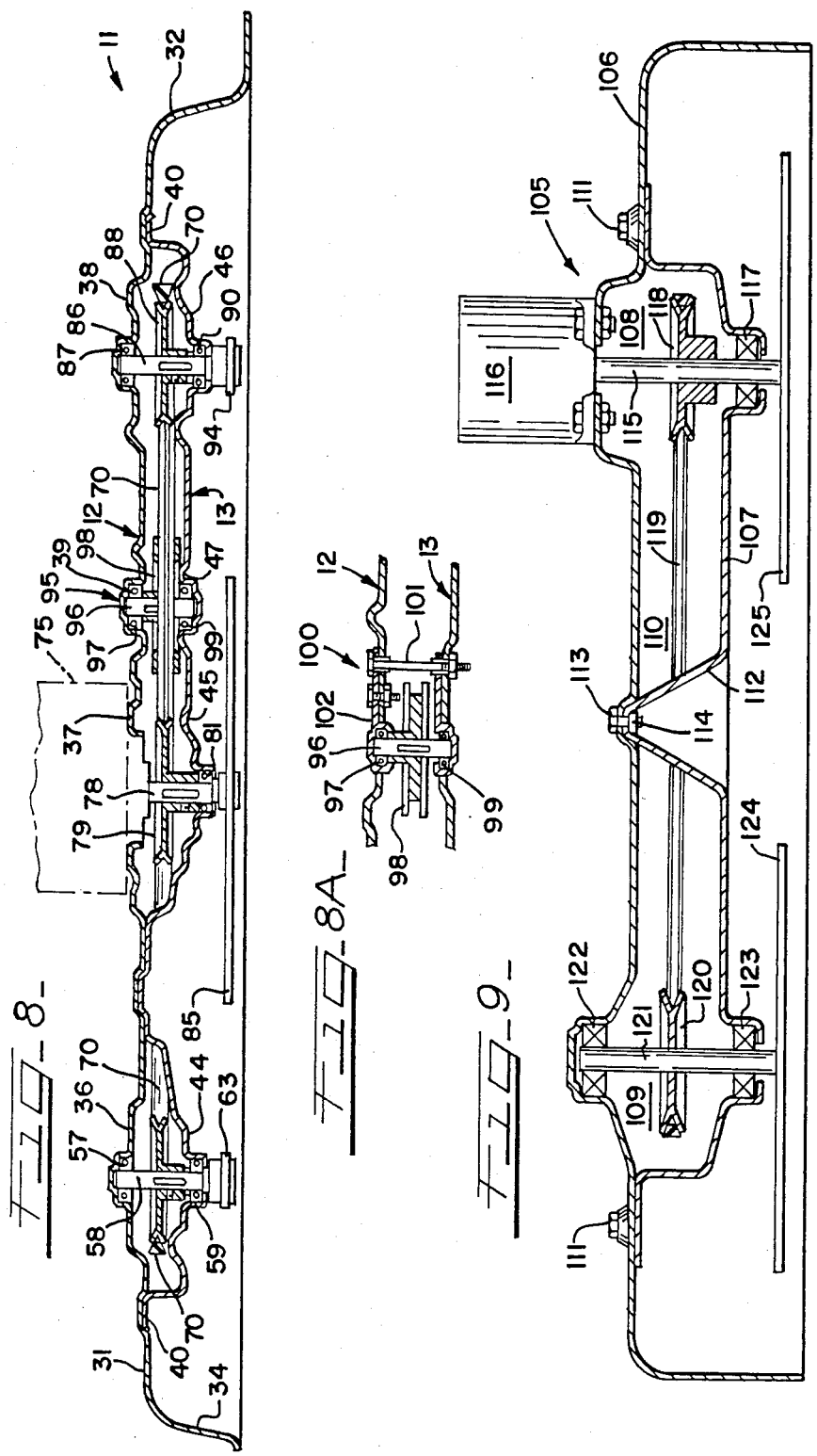

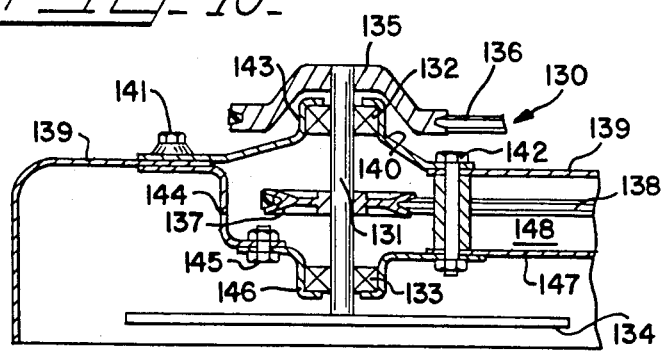
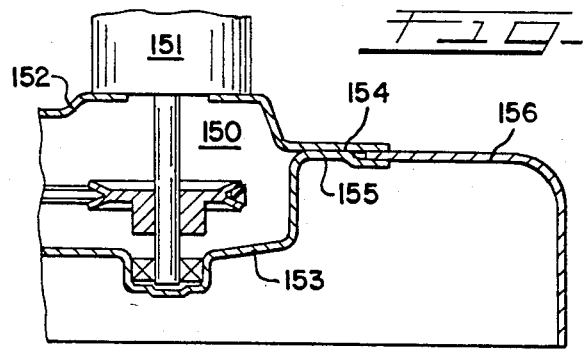
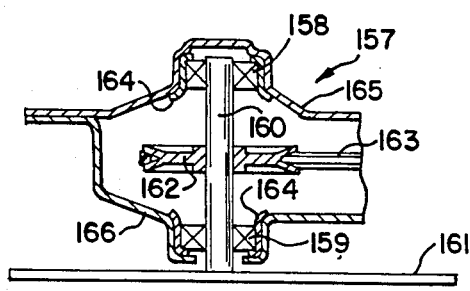

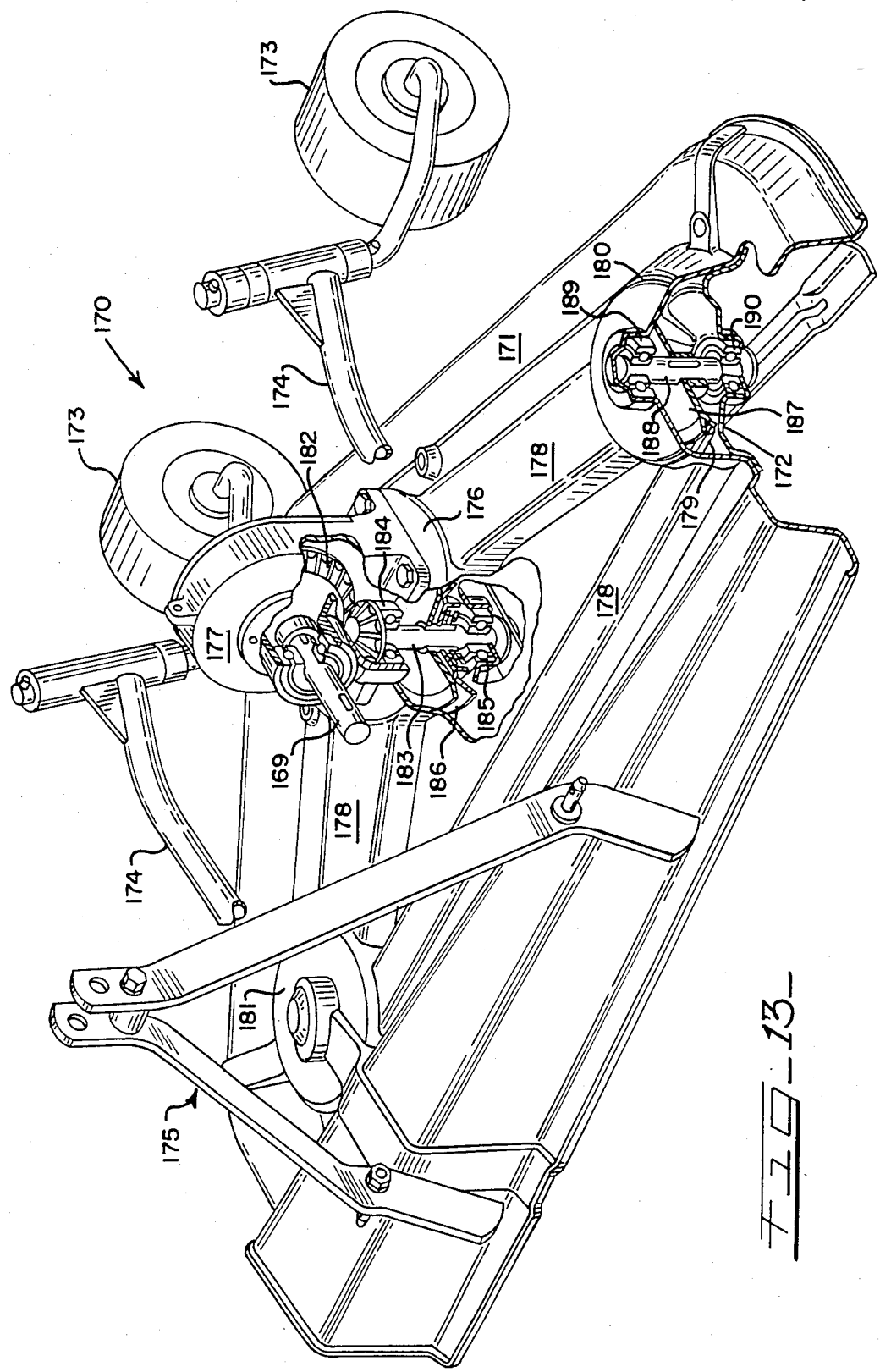

MOWER AND DRIVE TRAIN MOUNTING ASSEMBLY

BACKGROUND OF THE INVENTION

This invention generally relates to mowers of the type that are propelled over the ground and cut a path through a variety of vegetation. More particularly, the mowers include an improved deck configuration and pulley assembly mounting arrangement in order to eliminate cantilevered mounting structures that are typically accompanied by vibratory deck noise and the development of fatigue stresses and failures.

Riding mowers and mowing attachments for tractors commonly utilize belts or chains as power transmission means for supplying power to pulley assemblies some of which, and in some instances all of which, have mower blades attached thereto to supply the cutting and shearing operation. Such pulley assemblies, either power supplying or power receiving, conventionally include spindles which are mounted through an aperture in the mower deck by means of a spindle housing, the housing carrying spindle bearings at opposite ends thereof, the pulley itself being mounted generally above the spindle housing with a mowing blade being mounted at the other end of the spindle generally below the spindle housing. This conventional arrangement places the power transmitting or power receiving pulley in a cantilevered relationship with the mower deck and related elements carried by the deck and supporting the pulley. This conventional structure is also relatively expensive because it includes a number of parts which must be individually mounted. Mounting operational parts of a mower through the deck also requires shielding of at least some of those parts not only from the standpoint of user safety but also to protect such parts from damage and excessive wear.

Cantilevered loads are more susceptible to fluctuations produced by variance in belt tension, cutting load and the striking of hard objects by cutting blades. Fluctuating cantilevered loads cause a rocking action in such assemblies including at least a pulley, a spindle, spindle bearings, and a spindle housing, as well as a cutting blade if such forms a part of the assembly. Such a rocking action is not only detrimental to the particular assembly described, but is also detrimental to the mower deck to which such assemblies are rigidly mounted. The mower deck is typically made of relatively thin material such as metal or plastic, and stress risers are present at deck holes and welds that are provided for mounting the separate spindle assemblies as well as motors, gear boxes, shields, framework and the like. Any rocking action resulting from fluctuating cantilevered loads generates high stresses in the areas of the stress risers eventually resulting in the deck or other components thereon cracking or breaking from fatigue.

The present invention overcomes the aforesaid disadvantages by utilizing driving and driven assemblies which are straddle mounted in a deck configuration by appropriate bearings or the like, the deck configuration preferably including a plurality of deck members, typically upper and lower ones, which cooperatively define therebetween housing areas for encasing the moving parts including the pulleys, pulley spindles, bearings and drive belt or chain, in order to establish a structure permitting straddle-mounting of the rotating parts thereby eliminating cantilevered loads that exist when the pulley is mounted above or below rather than within and between such deck members. Preferably this structure also at least substantially encloses the moving parts not only to establish effective user safety but also to shield such parts from damage and to enhance the total structural integrity of the pulley mounting assembly and of the deck on which it is mounted.

SUMMARY OF THE INVENTION

A mower including driving and/or driven assemblies including spindle-mounted pulleys or the like is provided with an improved configuration for mounting to the deck of a mower or the like. The improved configuration preferably includes an upper deck member and a lower deck member that are detachably interconnected to each other in order to establish spindle support areas or housings in which the driving and/or driven spindles and related parts are mounted. The housing areas of the deck members carry spaced bearing means or the like which are arranged to straddle mount the pulley assemblies thereby eliminating cantilever mounting of the parts which distribute and/or receive power during operation. A power transmission means, which may be in the form of a drive belt, is preferably protectively received in tunnel-like areas formed by the upper and lower deck members, such areas being in communication with the housing areas of the pulley assemblies, the preferred form of the invention including a positionally adjustable idler pulley located relative to the pulley assemblies and controlling the positioning and tensioning of the power transmission means to provide increased effective power transmission engagement with the pulley assemblies.

BRIEF DESCRIPTION OF THE DRAWINGS

The invention, together with further objects and advantages thereof, may best be understood by reference to the followiIng description taken in conjunction with the accompanying drawings, in the several figures of which like reference numerals identify like elements, and in which:

FIG. 1 is a partly fragmented perspective view of a form of mower incorporating the features of the present invention;

FIG. 2 is a top perspective view of one form of deck assembly which incorporates the principles of the present invention and which is suitable for use on a mower as illustrated in FIG. 1;

FIG. 3 is a top perspective view of the lower deck member deck assembly of FIG. 2;

FIG. 4 is a cross-sectional view of the mower of FIG. 2 as along line 4—4 thereof;

FIG. 5 is a cross-sectional view of the mower of FIG. 2 as along line 5—5 thereof;

FIG. 6 is a cross-sectional view of the mower of FIG. 2 as along line 6—6 thereof;

FIG. 7 is a cross-sectional view of the mower of FIG. 2 as along line 7—7 thereof;

FIG. 8 is a cross-sectional view of the mower of FIG. 1 as along line 8—8 thereof;

FIG. 8A is a fragmentary sectional view of an idler assembly adapted for use in the mower of FIG. 1;

FIG. 9 is a cross-sectional view of a mower incorporating the principles of the present invention and illustrating a modified design;

FIG. 10 is a partial cross-sectional view of a further modified form of mower;

FIG. 11 is a partial cross-sectional view of still another modified form of mower;

FIG. 12 is a cross-sectional view showing a modified pulley assembly mounting arrangement; and FIG. 13 is a partly sectioned fragmentary perspective view of still another form of mower incorporating the principles of the present invention.

DESCRIPTION OF THE PREFERRED EMBODIMENTS

FIG. 1 illustrates a mower generally illustrated as 10 having a mower deck assembly generally designated 11 which, as shown in FIGS. 2 and 3, is formed from an upper deck member 12 (FIG. 2) and a lower deck member 13 (FIG. 3). The mower 10 illustrated in FIG. 1 is designed for detachable connection with a tractor or the like for pull-type operation as is well known. The improvements forming a part of the mower 10 to be described are equally useful in any type of known mower or generally similar device, including devices for attachment to the rear, front or side of a vehicle, as well as riding mowers, self-propelled mowers, push mowers, and mowers or other devices that are suitable for thatching, surface conditioning, ground breaking, seed bed preparation, or the like. For ease of illustration the larger type of tractor attached mower 10 is relied upon to describe the important features of the present invention.

Referring in some detail to FIG. 1, the deck assembly 11 is suitably attached to a supporting carriage generally designated as 14 which overhangs the top surface of the deck assembly 11 in supporting the attachments therewith. The carriage 14 is of known type and will be only generally described. The carriage includes horizontally extending legs 15 and 16 which are interconnected toward the rear of the mower 10 by a bar 17, the legs 15 and 16 and the bar 17 being provided with suitable attachments 18 which interconnect the carriage 14 with the upper deck member 12 of the deck assembly 11. The rear ends of the legs 15 and 16 of the carriage 14 are each provided with rollers or castors 19 of suitable design which extend downwardly and rearwardly of the mower deck assembly 11 to engage the ground being traversed during the mowing operation and to maintain the mower deck assembly 11 in appropriately spaced relationship to the ground so as to avoid scalping or the like.

The portion of the carriage 14 that is forward of and above the deck assembly 11 includes a hitch assembly having a pair of upwardly converging arms in the form of bars 20. Toward the bottom ends of the bars 20, bolts 21 pivotally interconnect the bars 20 with the arms 15 and 16, the bottom ends of the bars 20 being apertured for receiving therethrough a transversely positioned rod 22 carrying at opposite ends thereof rollers 23 of known type which are intended to lift the front of the deck assembly 11 in the event that the rollers engage a sufficiently raised ground portion, rock or the like which would cause turf scalping, damage to the mowing blades, or the like. The bars 20 further include transversely extending rods 24 and top apertured flange portions 25 which cooperate with elements forming a part of a tractor or other powered moving apparatus or vehicle to establish a hitch connection with the tractor or the like for towing of the mower 10. This type of hitch connection, which may vary, is well known and accordingly is not illustrated in detail.

As best shown in FIG. 2, the upper deck member 12 of the mower deck assembly 11 includes a central area 30 surrounded by a skirt area 31 which includes a tunnel like discharge portion 32 of slightly increasing elevation in a direction toward the discharge end 33 thereof. The skirt area 31 is partially defined by a depending wall portion 34 which extends about the lower deck member 13 and is formed integrally with the outer wall portion of the discharge tunnel 32. As will be described hereinafter, the depending wall portion 34 in conjunction with the discharge tunnel 32 extends downwardly in outwardly spaced relationship to the one or more mowing blades which, when included in a pulley assembly, project downwardly from the bottom deck member 13, the direction of rotation of the blades being such as to force the grass, weed, thatch or foliage fragments or other debris or surface materials outwardly toward the wall portion 34 and in a clockwise direction as viewed in FIG. 2 to effect discharge thereof through the discharge tunnel opening 33 in a generally known manner.

Upper deck member 12 can, as is illustrated in FIG. 2, be provided along the top surface thereof with a plurality of reinforcing strap-like bands 35 which basically extend from dome-like portions 36, 37, 38 and 39. These dome-like portions are raised areas in the upper deck member 12 which provide top housing portions for driving and driven means to be described. These dome-like portions, when provided, function to partially form boxed or housing-like areas in which the driving or driven means to be described are mounted.

The lower deck member 13 that is shown in FIG. 3 is typically shaped such that its periphery is in general conformity with the periphery of the central portion 30 of the upper deck member 12. The lower deck member is provided with a circumferentially continuous attachment flange 40 which conforms to the peripheral edge configuration of the central portion 30 of the upper deck member 12. Such peripheral portion of the upper deck member 12 as well as the flange 40 of the lower deck member 13 include aligned respective attachment areas 41 and 42 which are suitably apertured as illustrated to receive appropriate fasteners, such as bolts, to detachably interconnect the upper and lower deck members. Such detachable interconnection may be accomplished in any suitable manner, including welding and the like.

A depending, substantially vertical wall portion 43 is located inwardly of the circumferentially continuous flange 40 of the lower deck member 13, this wall portion 43 generally defining the circumferential confines of a central depressed area which has depending pocket-like circular areas 44, 45, 46 and 47 that are positioned in spaced relationship to each other. These depressed pocket-like areas are located to be aligned with the respective raised dome-like areas 36, 37, 38 and 39 of the top deck member 12 to cooperatively define the substantially enclosed boxed or housing-like areas receiving the driving and driven means to be described.

Between the pocket-like portions 44 and 45 the lower deck member 13 a raised attachment portion 48 is provided which has a detachable connection member 49 located along the top surface thereof that is aligned for attachment to the attachment member 50 forming a part of the upper deck member in FIG. 2. This particular form of connection between the cooperating deck members is illustrative of the manner in which the deck members may be detachably interconnected so as to provide the requisite strength and yet establish a plurality of spaced enclosed areas in which are mounted the driving and driven means of the mower, which areas are in communication through tunnel-like spaces for receiving power transmission means extending from one driving or driven means to another.

Additional strength can be provided to the upper and lower deck members by any suitable means which does not interfere with establishing the integrity of the enclosed areas for housing the driving and driven means and which does not interfere with protected communication between the power transmission means and the driving and driven means. For example, the outer surfaces of the dome-like portions 36 through 39 may be provided with reinforcing finger members 51, and the centrally depressed area of the lower deck member 13 circumferentially defined by the wall portion 43 may also include raised reinforcing ribs 52. These various types of undulations provide increased strength to the deck members.

Further structural features as well as the operational aspects of the mower of the subject invention will now be described in conjunction with the use of a drive belt and pulley system for operation of the mower blades. It will be understood that other suitable drive systems may be used, such as a chain and sprocket system.

FIG. 4 illustrates the mounting of a driven means in the box-like housing 55 defined by the top dome-like portion 36 of the upper deck member 12 and the pocket-like portion 44 of the bottom deck member 13. It can be seen that the dome-like portion 36 of the upper deck member 12 is provided with a bearing mounting area located centrally thereof in the form of a raised pocket 56. A known type of bearing assembly 57 is received in the pocket 56 in frictional engagement therewith so as to be retained thereby. A spindle 58 has its upper end frictionally received in the inner race of the bearing assembly 57 and extends downwardly with a bottom end portion thereof similarly frictionally engaged with a bottom bearing assembly 59. The bearing assembly 59 is received in a depending flange portion 60 and frictionally held therein, the flange portion 60 extending downwardly and slightly inwardly to define a bottom aperture 61 through which the spindle 58 extends into engagement with the mounting collar 62 of a known type of mower blade 63 or similar device such as a thatching blade or surface conditioning device.

Collar 62 projects downwardly and outwardly of the box-like housing 55 so that the blade 63 is located below the lower deck member 13 and can be operated within the confines of the depending wall 34 of the skirt 31 as well as the discharge tunnel 32, all forming a part of the upper deck member 12. In this manner, as the mower blade 63 rotates, the severed particles of grass, weeds, foliage or other debris or surface materials are confined within the total mower deck and are advanced by the action of centrifugal force around the outer periphery of the mower deck, through the discharge tunnel and ultimately away from the mower to one side thereof in the conventional manner. The spindle 58 has fixed thereto for rotation therewith a conventional form of pulley assembly including a pulley 64, an attachment collar 65 and an attachment member such as the illustrated set screw 66 for fixing the pulley 64 to the spindle 58.

FIG. 5 illustrates how the upper deck member 12 and the lower deck member 13 form a protective housing for the power transmission means which, in the illustrated embodiment, is a continuous belt 70. As previously described in connection with FIGS. 2 and 3, the upper and lower deck members intermediate the dome-like portions 36 and 37 are illustrated as including an attachment area formed from a raised dome-like portion 48 of the lower deck member 13 placed in engagement with an attachment area 50 of the upper deck member 12. With this arrangement, separated tunnel areas 71 are provided within the mower deck, and the drive belt 70 passing therethrough is protected from external damage. Also as previously referred to, the mating portions of the upper and lower deck members may, at this particular point of illustration as well as at any other points of detachable connection, be interconnected by a suitable fastener arrangement such as the illustrated bolt 72 and nut 73.

Also, as shown in FIG. 5 as well as other figures, it will be noted that the upper and lower deck members are configured to establish engaging and mating faces along the flange area 40 of the lower deck member 13. The provision of cooperating top and bottom deck members to provide enclosed housing areas is preferred and effectively protects the driving and driven means as well as the power transmission means from excessive wear or damage due to contact with dirt or other debris. The upper and lower deck members may be provided with substantial variations in configuration, and the provision of tightly engaging mating surface portions is readily accomplished while utilizing a minimum number of connectors, such as nuts and bolts.

FIG. 6 illustrates the driving assembly of the depicted mower, such driving assembly being in the form of a gearbox 75 shown in phantom which is of any suitable known type normally carried by a mower when it is being pulled by a tractor or the like. The gearbox 75 is suitably mounted to the top deck member through fasteners in the form of bolts or the like (not shown) that are received in appropriate mounting members 76 shown in FIG. 2. The gearbox is aligned with a central opening 77 located in the raised housing portion 37 and is drivingly attached to a driving pulley assembly including a spindle 78 having a known type of pulley 79 fixed thereto by a set screw 80, and/or key 89 or the like. The top portion of the spindle 78 is suitably journaled in the gearbox 75 whereas the bottom portion of the spindle is mounted in a known type of bearing assembly 81 which is mounted in a pocket formed in the depressed portion 45 of the lower deck member, the pocket being defined by a depending flange 82 having an opening 83 extending centrally therethrough and receiving therein a portion of a collar 84 which mounts a mower blade 85 in fixed relationship with the spindle 78 so as to rotate therewith and with the pulley 79. The drive belt 70 extends about the drive pulley 79 and, by reason of being in driving engagement with the remaining pulleys in the system, transmits power thereto for operation of the mower.

FIG. 7 illustrates the other driven pulley assembly shown in FIGS. 1 through 3, which assembly includes a pulley spindle 86, the top end of which is frictionally received in the inner race of a known form of bearing assembly 87 which in turn is frictionally mounted in the top pocket portion of the dome-like area 38 of the upper deck member 12. A pulley 88 is mounted on the spindle 86 by a set screw 80, key 89 or the like for rotation therewith. The bottom portion of the spindle 86 is in operative engagement with a bottom bearing assembly 90 which in turn is frictionally mounted in a depending flange portion 91 of the bottom pocket 46 of the bottom deck member 13. The flange portion 91 is centrally apertured to define an opening 92 through which extends a part of a collar 93 which carries a mowing blade 94 of conventional design. The assembly illustrated in FIG. 7 operates in the same manner as described in connection with the assembly of FIG. 4, with the drive belt 70 engaging the pulley 88 and rotating it and the mower blade 94 secured thereto. Here again, the entire assembly except for the mower blade 94 is protectively mounted within a housing defined by the cooperating portions 38 and 46 of the upper and lower deck members 12 and 13, respectively.

While it is preferred that the housing provide a substantially enclosed pocket, for each of the pulley assemblies of the various embodiments, the pocket can take on a somewhat skeletal configuration such as by having the cooperating portions, particularly the upper one, include strap-like members. Such a somewhat skeletal configuration could be utilized, for example, when the security, strength and encasement attributes of the pocket are not especially important for the particular mower or device within which the pulley assembly is used.

FIG. 8 generally illustrates the operative relationship between the driving and driven members of the mower. In addition, FIG. 8 illustrates the provision of an idler assembly generally designated at 95 which is mounted within the cooperating deck portions 39 and 47 of the upper and lower deck members 12 and 13, respectively. The idler assembly 95 includes a vertically positioned spindle 96 which is frictionally received in the inner race of a top bearing assembly 97 which is turn is frictionally mounted within the dome-like portion 39 of the upper deck member 12. The spindle 96 has suitably fixed thereon a pulley 98 of the type previously described with the lower end of the idler spindle 96 being suitably mounted in a conventional bearing assembly 99 received in the lower pocket portion 47 of the bottom deck member 13.

Referring to both FIGS. 2 and 8 it will be noted that the idler pulley assembly 95 is located adjacent the drive assembly area 37, somewhat between same and right hand (as viewed) driven assembly 38. The idler assembly 95 provides a pathway for the belt 70 that is not in a straight line but instead is offset in order to increase the length of the engagement between the drive belt 70 and the driving pulley 79 as shown in FIG. 6. FIG. 3 illustrates this pathway of the drive belt 70, which is shown in phantom in FIG. 3. Commencing at the left hand driven pulley assembly mounted in the pocket 44, it will be noted that during the time that the drive belt 70 extends about the outer periphery of such assembly it contacts approximately half or about 180° of the circumference of the pulley. As the drive belt 70 extends to the right as viewed in FIG. 3, it engages the drive pulley mounted as a part of the drive assembly in the pocket 45. It can be appreciated that, if the belt were to continue through an approximately straight-line path to the right-hand driven pulley assembly mounted in the pocket 46, the engagement between the belt 70 and the drive pulley 79 (FIG. 6) would be through an arc that is substantially less than 180°. Therefore, the idler pulley assembly 95 is mounted in offset relation in the pocket 47 intermediate the drive pulley in pocket 45 and the driven pulley mounted in pocket 46. As shown in FIG. 3, the drive belt 70 is threaded past the drive pulley and below (as viewed) the idler pulley and then threaded around the outer periphery of the driven pulley assembly mounted in the pocket 46.

Thus, the extent of belt engagement with the drive pulley 79 is increased by reason of the positioning of the idler pulley assembly 95 and the belt pathway developed by such threading of the drive belt 70 about same. The driven idler assembly mounted in the pocket 46 and illustrated in FIG. 7 receives approximately the same extent of drive belt engagement as previously described in connection with the driven pulley assembly of FIG. 4. With this arrangement the driving and driven pulleys each are engaged by the drive belt 70 to an approximately equal extent, approximately 180°, and effective transmission of power occurs without excessive wear of engaging parts.

FIG. 8A illustrates an idler pulley assembly, generally designated as 100, which is adjustable and which includes a pivot pin 101 that pivotally mounts a mounting bracket 102 to the deck assembly. The spindle 96 is secured to the mounting bracket 102, by virtue of which the idler pulley 98 is movable through a generally arcuate path in order to adjust the position of the idler pulley 98 with respect to the drive pulley 79 (FIG. 8).

The straddle mounting of the driving and driven pulleys described eliminates cantilevered loads normally present in driving and driven pulley assemblies of conventional mower configurations. Any type of mounting of the idler pulley assembly or assemblies, such as a cantilevered mounting, is possible for some mowers or devices, although straddle mounting thereof imparts the advantages of the invention to the idler assembly as well.

The pulley spindles of the various straddle mounted assemblies described are mounted by spaced bearings that are carried by both the upper and lower deck members. In most structures, each pulley is mounted on its spindle to be generally equidistant from the spaced bearings such that the power being transferred is applied substantially centrally of the distance between the bearings. Variation in belt tension and in cutting loads and rocking action caused by cutting blades striking hard objects will not be as damaging to the deck members as with a cantilevered mounting arrangement. With the elimination of spindle rocking action, high stresses will not be generated in the areas of any stress risers thus substantially reducing the likelihood of cracking or breakage due to fatigue.

FIG. 9 illustrates a modified form of mower utilizing the principles of the present invention. Mower 105 includes an upper deck member 106 and a lower deck member 107 which are shaped to form box-like housing areas 108 and 109 interconnected by a tunnel portion 110. The lower deck member 107 is suitably bolted or otherwise secured at 111 to the upper deck member 106, and such may include a variety of registry and spacer options. For example, a centrally raised cone-like portion 112 is provided to centrally reinforce both of the deck members between the areas 108 and 109 by detachable engagement of the cone-like portion 112 with the upper deck member such as by utilizing a bolt 113 and a nut 114. The housing area 108 includes a spindle 115 journaled at the top thereof in a gearbox 116 and at the bottom thereof in a bearing assembly 117 which is carried in a suitable centrally apertured pocket of the bottom deck member 107 as previously described. Spindle 115 carries a drive pulley 118 centrally thereof which transmits power through a drive belt 119 extending through the tunnel portion 110 to a driven pulley 120 mounted on a rotatable spindle 121 between opposed bearing assemblies 122 and 123 suitably mounted in pockets formed in the upper and lower deck members in the manner previously described. The spindle 121 is driven and may have attached thereto, as illustrated, a blade 124 which depends below the lower deck member 107 for cutting or conditioning rotation in the manner previously described. A blade 125 may also be attached to the bottom end of the spindle 115 if the design and size of the mower 105 permits, for example, the use of a pair of blades. The modified structure of FIG. 9 further illustrates the versatility of the invention wherein cooperating deck members are used for straddle mounting of driving and driven assemblies, for mutual reinforcement and for protection of confined parts.

Further illustrating the present invention, FIG. 10 depicts a modified form of straddle mounted drive assembly. The spindle 131 is straddle mounted between bearings 132 and 133 in the manner previously described, and when same is to function as a cutting assembly, the bottom portion of the spindle 131 projects outwardly below the lower deck member to expose a rotatable mower blade 134 or the like. The top end of the spindle 131 extends beyond the top bearing 132, and the associated portion of the upper deck member and has fixedly mounted thereto a drive pulley 135, which is driven by a belt 136 that in turn is connected to an external power source. Rotation of the drive pulley 135 causes the spindle 131 to be driven in order to drive a pulley 137 fixed to the spindle 131 and engaged with an internal drive belt 138 which may transmit power to another driven assembly (not shown). The straddle mounting of the spindle 131 permits this type of power input to be effectively utilized while gaining the advantage of eliminating cantilevered loads.

Still further, FIG. 10 illustrates the use of modified deck members. An upper deck member 139 is supplied, and a housing cap member 140 is fastened thereto by bolts 141 and 142. The cap member 140 includes a pocket portion 143 mounting the top bearing 132 therein. The spindle housing is further defined by a lower vertical deck member portion 144 which is generally S-shaped and is attached at the top thereof to the upper deck member 139 by the bolt 144. The bottom portion of the lower deck member 144 is attached by a bolt 145 to a bearing carrier 146 which mounts the lower bearing 133 therein. The bearing carrier 146 is attached by the bolt 142 to a further lower deck member 147 which is in spaced relation to an adjacent portion of the upper deck member 139 to define a tunnel-like passageway 148 for the drive belt 138. In this manner, separate bearing carriers may be utilized in the structure of the mower deck. It can be appreciated that in utilizing upper and lower deck members in the manner described, such deck members are detachable so as to permit ready mounting of various parts in their operative positions as well as replacement of parts as might prove necessary during extended operation of the mower. FIG. 10 illustrates a convenient manner of installing the bearings during initial set-up of the mower, the bearings being premounted in the cap 140 and the lower bearings carrier 146. FIG. 10 also illustrates the utilization of a plurality of deck member parts to permit ready access to specific areas of pulley operation.

FIGS. 11 and 12 illustrate further versatility in the design of the present invention. FIG. 11 shows the design of a drive assembly 150 of the type previously described utilizing a gearbox 151 mounted on the top deck member 152. The bottom deck member 153 completes the enclosing of the drive assembly 150. This modification illustrates the utilization of a three-member deck. The upper deck member 152 may be provided with a flat horizontal flange portion 154 which overlies a corresponding upper flange portion 155 formed in the periphery of the lower deck member 153. The flange 155 at the outer periphery thereof may be downwardly offset so as to receive between same and the adjacent portion of the top flange 154 the inner periphery of a skirt and/or discharge tunnel 156 forming a part of the mower deck. Alternatively, flange 154 and/or flange 155 may be otherwise structured to receive the skirt 156 in substantially any manner. For example, the skirt 156 may be below or above both flanges. With this arrangement the mower deck may be formed from three different parts, such parts including the upper and lower deck members of the type previously described with the third part defining the peripherally depending skirt portion including the discharge tunnel. The discharge tunnel can then be made of a different material such as a plastic which expands and contracts at a rate different from the expansion and contraction rate of the upper and lower deck members without significant problems due to differing expansion and contraction rates. This is possible because of the ability of the skirt 156 to shift or float with respect to the flanges 154 and 155.

FIG. 12 illustrates a driven pulley assembly 157 which includes a top bearing 158 and a bottom bearing 159 mounting a spindle 160 therebetween in accordance with the principles of the present invention. A mower blade 161, when included, is mounted to the bottom projecting end of the spindle 160, and a pulley 162 is mounted on the spindle 160 and driven by a belt 163. Each of the bearings 158 and 159 are encased in a bearing carrier 164, the top carrier 164 being frictionally inserted in the dome-like pocket portion of the upper deck member 165, and the bottom carrier 164 being frictionally mounted in the pocket-like portion of the lower deck member 166. FIG. 12 illustrates adaptation of the multiple deck member design of the present invention to accommodate bearing retainers thereby facilitating assembly of the various parts for operational use.

FIG. 13 illustrates a mower using the basic principles of the present invention while additionally making use of a tensioning idler pulley such as one that is spring-loaded or bolt tightenable and/or the illustrated centrifugal clutch drive arrangement. The mower 170 includes an upper deck member 171 and a lower deck member 172 which are cooperatively arranged to establish the triangular drive arrangement that has been described in connection with FIGS. 1 through 3. Briefly, the mower 170 includes rear rollers 173 mounted to the forwardly extending rods 174 which are appropriately attached (not shown) to a vertically extending yoke 175 designed for attachment to a hitch of a tractor or the like. Mower 170 of FIG. 13 is supported for forward movement and against scalping by the rollers 173, yoke 175 and related parts. The mower deck itself includes a drive assembly housing 176 which is provided with a gearbox 177 mounted on the top surface of the upper deck member 171. The deck members 171 and 172 cooperatively define therebetween tunnel areas 178 which house a drive belt 179 in protective relationship of the type previously described. The tunnels 178 extend from the drive assembly 176 to a pair of driven assemblies 180 and 181, such assemblies being of similar construction thus necessitating description of only one such assembly. While an idler pulley assembly is preferred in the triangular drive arrangement of the mower 170 of FIG. 13, such is not shown and if included would function in substantially the same manner as described in connection with FIG. 8.

The gearbox 177 includes a power supply shaft 169 which drives a planetary gear arrangement 182 to supply power to the drive spindle 183. The drive spindle 183 is straddle-mounted between upper and lower bearing assemblies 184 and 185, respectively. The spindle includes a known typ of centrifugal clutch assembly 186 which includes sheaths slidably mounted on the spindle 183. Centrifugal clutch assembly 186 may be axially activated or radially activated such that when centrifugal forces imparted thereto increase, the drive belt tightens. The drive belt 179 engages the assembly 186 and is in driving engagement with a pulley 187 mounted on a spindle 188 and straddle-mounted by bearing assemblies 189 and 190, all forming a part of the driven assembly 180. As is conventional in the operation of a centrifugal clutch drive arrangement, during the time that the power input increases, the degree of engagement of the drive belt 179 with the driven assembly 180, 181 also increases, thereby assuring effective power transmission while also permitting idling with reduced operational power transmission. If desired, the centrifugal clutch drive arrangement can effect engagement during start up and effect disengagement during shut down.

The subject invention provides an improved unitized deck configuration which is applicable for both single and multi-spindle decks. The deck serves not only for blade shrouding and/or mounting of power supplying parts, but also functions as a bearing carrier, as a drive belt shield, as an integral box structure frame, as a straddle bearing mount and in order to effect noise and vibration dampening. The straddle mounting of the spindle pulleys provided by the spaced deck configuration provides a straight, lateral loading through the spindle and bearing assembly and substantially eliminates any cantilever loading. Substantial elimination of cantilever loading reduces bearing loading, increases bearing life, basically eliminates deck fatigue and increases belt life. Harmonic noise vibrations, particularly in open deck areas, which can exceed hazardous noise levels, are substantially eliminated. Deck noise generation is greatly reduced thereby permitting noise standards for the complete mower to be achieved in an especially economical manner. Other advantages include reduced user injury hazards and the ability to provide a more aesthetically appealing deck assembly design. The number of components required for a deck and spindle mounting assembly is reduced because the spaced deck members themselves become bearing carriers.

Separation of the top and lower deck members creates a boxed section laterally along the deck between spindles thus forming a sound and rigid deck structure in the general nature of a honeycomb. The profile of the boxed areas may be varied to produce additional and increased structural strength as might be required by variations in frame, wheel and gearbox mountings. This boxed design provides an ideal enclosure for the drive belt or chain and substantially eliminates any need for supplemental drive belt safety shielding. The moving component including the drive belt are well protected from oil, debris and sunlight that might reduce belt life or require additional maintenance. This boxed structure eliminates additional welds or bolts necessary to attach structural members for safety shielding or the like, thus reducing stress risers in the deck. Improved air flow characteristics also result. The upper deck member is shaped for discharge tunneling while the lower deck member is shaped to permit improved air flow characteristics without the addition of separate air or grass deflectors or baffles, again eliminating stress risers where such deflectors or baffles otherwise might have been mounted.

As previously described, the upper and lower deck members typically are detachably engaged to each other to permit ready assembly of the mower as well as servicing thereof. The drive belt may be placed in operative position on the various pulleys while either the upper or the lower deck member is removed. After placing the upper or lower deck member into engagement with the bottom or top deck member, desired tensioning of the drive belt typically may be readily obtained, for example, by adjusting the idler pulley as illustrated and described in connection with FIG. 8A or by other belt tightening or pulley tensioning arrangements.

While particular embodiments of the invention have been shown and described, it will be understood by those skilled in the art that such are illustrative of some of the applications of the principles of the present invention and that changes and modifications may be made therein without departing from the true spirit and scope of the invention.

We claim:

1. An apparatus for cutting ground foliage, said apparatus comprising:
   a deck having an upper section and a lower section;
   driving means mounted between and onto a mounting assembly of said upper section and a mounting assembly of said lower section, said driving means having a blade suitable for mowing mounted thereon below said lower deck section;
   driven means mounted between and onto a mounting assembly of said upper section and a mounting assembly of said lower section;
   flexible power transmission means interengaging said driving means at a location thereof between its said upper section mounting assembly and its said lower section mounting assembly, said power transmission means also interengaging said driven means at a location thereof between its said upper section mounting assembly and its said lower section mounting assembly; and
   a blade suitable for mowing and the like depending from at least said driven means.

2. The apparatus according to claim 1, wherein said upper and lower sections of said deck are upper and lower deck members that define a plurality of boxed areas, each said driving means and driven means being mounted in one of said boxed areas, said boxed areas being connected by tunnel-like sections to allow said flexible power transmission means to extend between said driving means and said driven means.

3. The apparatus according to claim 2, wherein said boxed areas include spaced bearing mounting portions between which said driving means and said driven means extend.

4. The apparatus according to claim 3, wherein said upper and lower deck members are detachably connected together.

5. The apparatus according to claim 4, wherein each of said driving means and said driven means includes pulley means rotatably mounted between said respective mounting assemblies and operatively engaged by said power transmission means.

6. The apparatus according to claim 4, further comprising a plurality of driven means, and wherein said flexible power transmission means transfers power from said driving means to said driven means;

said driving means and driven means including power dispensing means rotatably mounted between said respective mounting assemblies, said flexible power transmission means being sufficiently flexible to extend around at least a portion of said power dispensing means and be in driven or driving engagement therewith; and idler means mounted on said deck and in guiding engagement with said flexible power transmission means, said idler means being positioned to increase the extent of engagement between said flexible power transmission means and at least one of said power dispensing means.

7. The apparatus according to claim 6, wherein said idler means is adjustable relative to said at least one of said power dispensing means.

8. The apparatus according to claim 2, further comprising a plurality of driven means, and wherein said flexible power transmission means transfers power from said driving means to said driven means.

9. The apparatus according to claim 8, wherein said flexible power transmission means comprises an elongated flexible member rotatable mounted between a pulley of said drive means and a pulley of each of said driven means, said elongated flexible member being sufficiently flexible to extend around at least a portion of each of said pulleys and be in driven or driving engagement therewith; and idler means mounted on said deck and in guiding engagement with said elongated flexible member, said idler means being positioned to increase the length of engagement between said elongated flexible member and at least one of said pulleys.

10. The apparatus according to claim 9, wherein said idler means is adjustable relative to said at least one of said pulleys.

11. An apparatus for mowing ground foliage, comprising:

a deck formed from upper and lower members, said deck membrs defining therebetween a plurality of at least substantially enclosed areas and tunnel-like sections, said substantially enclosed areas being connected by said tunnel-like sections;

power drive means mounted in one of said substantially enclosed areas, said power drive means including a power drive pulley and a pair of bearing means carried by said deck members, said bearing means pair straddle mounting said power drive pulley relative to engagement of said power drive pulley with a flexible power transmission means:

blade drive means mounted in at least one of said plurality of said substantially enclosed areas, at least one blade drive means carrying a blade suitable for mowing and the like which is rotatably mounted below the substantially enclosed area that is associated therewith;

flexible power transmission means extending between said substantially enclosed areas through said tunnel-like sections for interconnecting said plurality of blade drive means and said power drive means; and each said drive blade means including a blade drive pulley and a pair of bearing means carried by said deck members, each said bearing means pair straddle mounting each blade drive pulley relative to engagement of said flexible power transmission means with said blade drive pulley.

12. The apparatus according to claim 11, wherein each of said deck members in said substantially enclosed areas include bearing mounting pockets in spaced alignment with each other and having mounted therein said bearing means which straddle mount said power drive pulley and said blade drive pulley.

13. The apparatus according to claim 12, wherein said deck members are detachably interconnected to define said substantially enclosed areas and said tunnel-like sections.

14. The apparatus according to claim 13, further including idler means positioned in guiding engagment with said flexible power transmission means and relative to said blade drive means to increase the length of engagement of said flexible power transmission means with at least one of said blade drive means or said power drive means; and means for adjusting the position of said idler means relative to said blade drive means or said power drive means.

15. The apparatus according to claim 12, further including idler means positioned in guiding engagement with said flexible power transmission means and relative to said blade drive means to increase the length of engagement of said flexible power transmission means with at least one of said blade drive means or said power drive means; and means for adjusting the position of said idler means relative to said blade drive means or said power drive means.

16. The apparatus according to claim 11, further including idler means positioned in guiding engagement with said flexible power transmission means and relative to said blade drive means to increase the length of engagement of said flexible power transmission means with at least one of said blade drive means or said power drive means.

17. The apparatus according to claim 16, further including means for adjusting the position of said idler means and for varying the position of said idler means relative to said blade drive means or said power drive means.

18. An apparatus conditioning a ground surface, comprising:

a deck formed from an upper member and a lower member, said upper member and lower member defining therebetween a plurality of pocket-like chambers and a plurality of tunnel-like sections connecting said pocket-like chambers;

a drive train assembly including a plurality of drive member assemblies and a plurality of bearing pairs, each said drive member assembly including a drive member mounted in one of said pocket-like chambers together with one of said bearing pairs, one bearing of each said bearing pair being mounted on said upper deck member and the other bearing of each said bearing pair being mounted to said lower deck member in said pocket-like chamber, one of said drive members being rotatably mounted between each said bearing pair, each said drive member assembly having mounted theron below said lower deck member a blade suitable for conditioning a ground surface;

drive means for driving one of said drive members; and flexible power transmission means extending between said pocket-like chambers through said tunnel-like sections interengaging and transmitting power between said drive members in order to effect the rotation of said blades mounted on said drive members.

19. The apparatus according to claim 18, wherein said drive member is a pulley and said flexible power transmission means is a drive belt.

20. The apparatus according to claim 18, wherein said drive train assembly includes tensioning means for tensioning said flexible power transmission means during operation thereof.

* * * * *

UNITED STATES PATENT AND TRADEMARK OFFICE
CERTIFICATE OF CORRECTION

PATENT NO. : 4,724,660

DATED : February 16, 1988

INVENTOR(S) : Bowie et al.

It is certified that error appears in the above-identified patent and that said Letters Patent is hereby corrected as shown below:

Col. 11, line 12, "typ" should read --type--.
Col. 13, line 32, "rotatable" should read --rotatably--; line 49, "membrs" should read --members--.

Signed and Sealed this

Thirteenth Day of December, 1988

*Attest:*

DONALD J. QUIGG

*Attesting Officer*     Commissioner of Patents and Trademarks